June 18, 1963 M. BURKE 3,094,356
CHILD'S CAR SEAT
Filed June 5, 1962
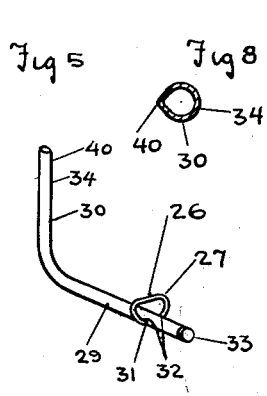
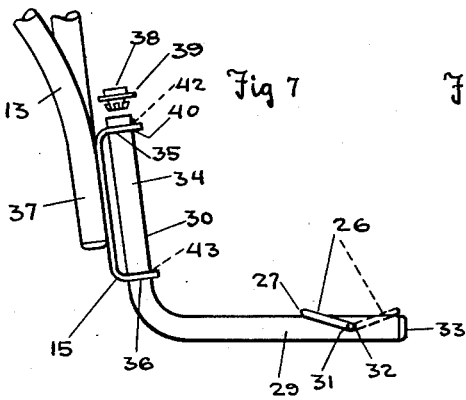
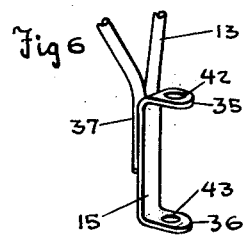
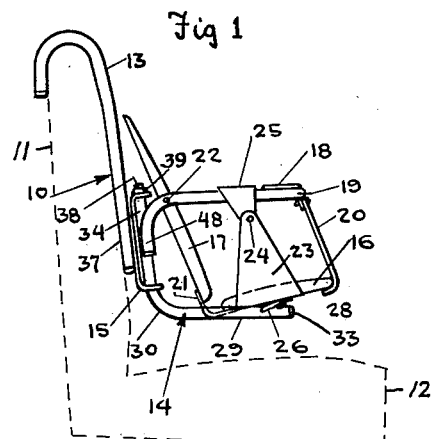
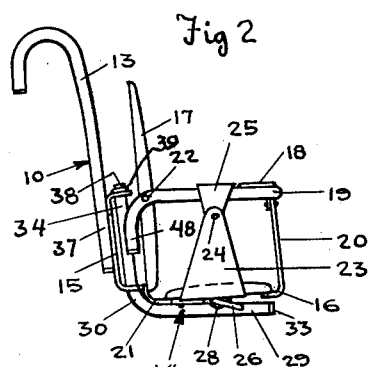
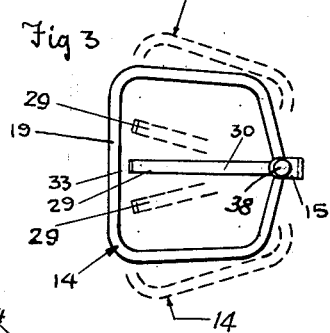
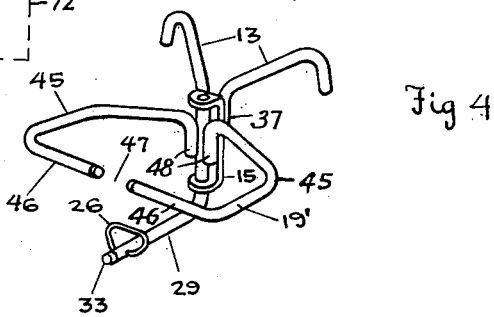
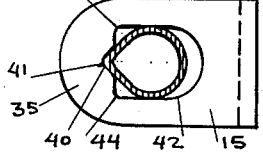
Inventor:
Mary Burke
Andrew F. Wintercorn
Atty

United States Patent Office 3,094,356
Patented June 18, 1963

3,094,356
CHILD'S CAR SEAT
Mary Burke, 507 W. 13th St., Sterling, Ill.
Filed June 5, 1962, Ser. No. 200,093
14 Claims. (Cl. 297—254)

This invention relates to a child's car seat designed for attachment over the back of existing automobile seats.

The present child's car seat differs from those heretofore available in the following important respects:

(1) The child's car seat can be adjusted easily from a normal upright position to a semi-reclining position for greater comfort when the child falls asleep or is supposed to fall asleep, and this adjustment can be made relative to the supporting frame structure by the parent so easily and quickly that it is usually not even necessary to stop the car for that purpose, and (2) The child's car seat can be swung laterally from a normal straight forward position to the right or left to avoid or reduce glare, the supporting frame structure in this case being shifted to the right or left relative to a bracket on the hanger that hooks over the back of the automobile seat, thereby not disturbing whatever setting the child's car seat has in relation to the supporting frame structure at the time.

Another object of the invention is to provide a child's car seat adapted to be constructed to a large extent of light and fairly inexpensive metal tubing, thereby insuring not only much less weight overall but also attractive appearance.

The invention is illustrated in the accompanying drawing in which:

FIG. 1 is a side view of a child's car seat made in accordance with my invention, indicating in dotted lines the mode of support on the back of an existing automobile seat, the child's car seat being shown in semi-reclining position;

FIG. 2 is a view similar to FIG. 1 showing the child's car seat in the normal upright position;

FIG. 3 is a plan view of the supporting frame structure, indicating in dotted lines how the same is adapted to be swung to the right or left from a normal straight forward position, the hanger applicable to the back of the automobile seat being omitted;

FIG. 4 is a perspective view of another frame structure in which the horizontal top frame for the support of the child's car seat is open at the front, as distinguished from the closed front on the corresponding part of FIG. 3;

FIGS. 5 and 6 are perspective views of two portions of FIG. 4 on a larger scale;

FIG. 7 is a side view of parts of FIGS. 5 and 6, illustrating the mode of assembly;

FIG. 8 is a horizontal section through the upper end of the swingable frame member shown in FIG. 5, and FIG. 9 is an enlargement of a portion of FIG. 3 to better illustrate the mode of operation.

Similar reference numerals are applied to corresponding parts throughout these views.

Referring to the drawing, the reference numeral 10 designates the improved child's car seat attachment of my invention shown in FIG. 1 as applied over the back 11 of a conventional automobile seat 12, the child's car seat 10 comprising a hanger 13 on which a supporting frame structure 14 is mounted for pivotal adjustment relative to a generally U-shaped bracket 15 carried on the hanger 13, and the child's seat 16 and seat back 17 tiltably adjustable in and with respect to the supporting frame structure 14. A top cross-piece or tray 18 is preferably secured in any suitable way to the top of the generally rectangular top frame member 19 of frame 14 at the front, and there is a single flexible strap 20 attached at the middle of the front of the seat 16 and two laterally spaced flexible straps 21 attached to the back of the seat 16, the strap 20 being connected at its upper end to the middle of the front cross-portion of frame member 19, and the flexible straps 21 being attached at their other ends to the lower end of the seat back 17. Pins 22 pivotally connect the opposite sides of the seat back 17 near the middle to the opposite sides of the top frame member 19 of frame 14 at the back, and there are side pieces 23 secured to the opposite sides of the seat 16 and pivoted as at 24 to slings 25 secured to the opposite sides of the top frame member 19 of frame 14 for further support of the seat 16. With this construction, a generally U-shaped yoke 26 of heavy round wire, having its cross-portion 27 pivotally connected, as shown at 28 in FIGS. 1 and 2, to the center of the seat 16 on the bottom thereof, and pivotally connected to the horizontal portion 29 of the L-shaped frame member 30 in any suitable way, as by entry of the inwardly bent aligned horizontal end portions 31 on the ends of the arms of the U 26 in bearing holes 32 provided therefor in alignment on opposite sides of the frame member 30, serves to hold the seat 16 and back 17 in the normal upright position of FIG. 2 when the yoke 26 extends rearwardly, as shown in that view, but the seat 16 and back 17 may be shifted easily to the semi-reclining position of FIG. 1 when the yoke 26 is swung forwardly, as seen in that view. The bearing 28 can be notched out at the middle thereof to straddle the top of the horizontal portion 29 of frame member 30 in either position and thereby eliminate lateral strain on the yoke 26 and also give lateral stability to the seat 16 and reduce strain on the pivots 22. The flexibility of the straps 20 and 21 makes shifting of the seat 16 and back 17 from one position to the other very easy.

The L-shaped frame member 30, which is preferably made of metal tubing bent to the desired shape with a cap 33 applied to and closing the front end of its horizontal portion 29, has its upright rear portion 34 pivotally mounted in the forwardly bent end portions 35 and 36 of the generally U-shaped bracket 15 that is welded or otherwise suitably secured by its upright cross-portion to the downwardly extending middle portion 37 of the generally V-shaped hanger 13. A plug 38 having an annular flange 39 of large enough radius to project sufficiently from the upper end of the tubular member 30 when the plug 38 is secured therein serves to prevent downward displacement of the frame member 30 relative to the bracket 15 and also allow the seat as a whole to be swung laterally from a normal straightforward position to the right or left to protect the child from glare, where merely shifting the seat from upright position to semi-reclining position is not enough. In the normal straight forward position of the seat the vertical V-shaped detent 40 defined on the front of the upper end portion of the upright rear portion 34 of frame member 30 engages in a V-shaped notch 41 provided in the front of the slightly elongated bearing slot 42 in the upper end portion 35 of bracket 15 to hold the seat releasably in this position, although there is a circular bearing hole 43 in the lower end portion 36 of the bracket allowing turning of portion 34 of frame member 30 therein for oscillation of the seat to the right or left from the straight forward position. In the laterally shifted positions of the seat, indicated by dotted line positions of frame 14 in FIG. 3, the V-shaped detent 40 engages in V-notches 44 seen in FIG. 9 in laterally spaced relation on opposite sides of notch 41, whereby to hold the seat releasably in either of those positions. It is clear that the lateral shifting of the seat can be accomplished with equal facility with the seat upright or reclining.

In conclusion, the construction shown in FIG. 4 is the same as the one just described except that the top frame 19' in that case is made in two generally U-shaped tubular halves 45 with the coaxially arranged horizontal front end portions 46 spaced as shown at 47. Such a construction should be manufacturable at less cost and still give substantially the same advantages as the one-piece top frame 19 previously described. In both cases, the vertical downwardly bent rear end portions 48 are welded or otherwise rigidly secured to opposite sides of the upright rear portion 34 of frame member 30 about midway between the upper end portion 35 and lower end portion 36 of bracket 15.

It is believed the foregoing description conveys a good understanding of the objects and advantages of my invention. The appended claims have been drawn to cover all legitimate modifications and adaptations.

I claim:

1. A seat of the character described comprising a fixed support, a generally L-shaped frame member pivoted with respect to said support by means of the upright leg of the L for lateral oscillation of the horizontal leg, a generally rectangular horizontal frame above said horizontal leg fixed to said upright leg for oscillation laterally with the horizontal leg, a horizontal seat bottom supported for oscillation with said horizontal leg, an upright seat back supported for oscillation with said horizontal frame, and detent means for releasably holding the seat in either one of a plurality of positions of lateral adjustment.

2. A seat as set forth in claim 1 wherein the seat bottom and seat back are interconnected, said seat back being pivoted relative to the back portion of the horizontal frame to swing from an upright to a reclining position, the seat bottom being movable relative to the horizontal leg of the L-shaped frame from a rearward horizontal position to a forward position of rearward inclination.

3. A seat as set forth in claim 1 including a tray carried horizontally on top of the front portion of said horizontal frame.

4. A seat as set forth in claim 1 wherein the horizontal frame comprises two generally U-shaped frame members in opposed relation forming the opposite sides of said frame, each having an upright end portion at the rear rigidly connected to the upright leg of the L, the front ends being disposed in coaxial end to end relationship.

5. A seat as set forth in claim 1 wherein the horizontal frame comprises two generally U-shaped frame members in opposed relation forming the opposite sides of said frame, each having an upright end portion at the rear rigidly connected to the upright leg of the L, the front ends being disposed in coaxial end to end relationship, and a tray mounted on top of said front ends and rigidly interconnecting the same.

6. A small size seat of the character described comprising an upright hook-shaped suspension frame adapted to hook over the back of a larger seat for support of the smaller seat thereon, a generally U-shaped bracket mounted by its cross-portion rigidly on said suspension frame in a vertical plane providing forwardly extending upper and lower projections, said projections having registering bearings openings provided therein, an L-shaped frame member of circular cross-section having the upright leg of the L mounted in said bearing openings for oscillatory movement of the horizontal leg, a generally rectangular horizontal frame above said horizontal leg fixed to said upright leg for oscillation laterally with the horizontal leg, a horizontal seat bottom supported for oscillation with said horizontal leg, an upright seat back supported for oscillation with said horizontal frame, and detent means for releasably holding the seat in either one of a plurality of positions of lateral adjustment.

7. A seat as set forth in claim 6 wherein the seat bottom and seat back are interconnected, said seat back being pivoted relative to the back portion of the horizontal frame to swing from an upright to a reclining position, the seat bottom being movable relative to the horizontal leg of the L-shaped frame from a rearward horizontal position to a forward position of rearward inclination.

8. A seat as set forth in claim 6 including a tray carried horizontally on top of the front portion of said horizontal frame.

9. A seat as set forth in claim 6 wherein the horizontal frame comprises two generally U-shaped frame members in opposed relation forming the opposite sides of said frame, each having an upright end portion at the rear rigidly connected to the upright leg of the L, the front ends being disposed in coaxial end to end relationship.

10. A seat as set forth in claim 6 wherein the horizontal frame comprises two generally U-shaped frame members in opposed relation forming the opposite sides of said frame, each having an upright end portion at the rear rigidly connected to the upright leg of the L, the front ends being disposed in coaxial end to end relationship, and a tray mounted on top of said front ends and rigidly interconnecting the same.

11. A small size seat of the character described comprising an upright hook-shaped suspension frame adapted to hook over the back of a larger seat for support of the smaller seat thereon, a generally U-shaped bracket mounted by its cross-portion rigidly on said suspension frame in a vertical plane providing forwardly extending upper and lower projections, said projections having registering bearing openings provided therein, an L-shaped frame member of circular cross-section having the upright leg of the L mounted in said bearing openings for oscillatory movement of the horizontal leg, a generally rectangular horizontal frame above said horizontal leg fixed to said upright leg for oscillation laterally with the horizontal leg, a horizontal seat bottom supported for oscillation with said horizontal leg, an upright seat back supported for oscillation with said horizontal frame, one of said bearing openings having detent notches provided therein, and a detent projection provided on the upright leg of said L-shaped frame member engaging selectively in either of said notches to lock the seat releasably in adjusted position.

12. A seat as set forth in claim 11 wherein the L-frame is of tubular material and has the detent projection of V-shape provided by forming the wall of the tube.

13. A seat of the character described comprising a fixed support providing vertically spaced aligned bearing openings, a generally L-shaped frame member pivoted with respect to said support in said bearing openings by means of the upright leg of the L for lateral oscillation of the horizontal leg, a generally rectangular horizontal frame above said horizontal leg fixed to said upright leg for oscillation laterally with the horizontal leg, a horizontal seat bottom supported for oscillation with said horizontal leg, an upright seat back supported for oscillation with said horizontal frame, one of said bearing openings having detent notches provided therein, and a detent projection provided on the upright leg of said L-shaped frame member engaging selectively in either of said notches to lock the seat releasably in adjusted position.

14. A seat as set forth in claim 13 wherein the L-frame is of tubular material and has the detent projection of V-shape provided by forming the wall of the tube.

References Cited in the file of this patent

UNITED STATES PATENTS

| | | |
|---|---|---|
| 136,381 | Motter | Mar. 4, 1873 |
| 355,911 | Bartow | Jan. 11, 1887 |
| 2,244,650 | Curran et al. | June 3, 1941 |
| 2,792,951 | White | May 21, 1957 |
| 2,890,740 | Larson | June 16, 1959 |
| 3,039,819 | Williams et al. | June 19, 1962 |